United States Patent
Bang

[19]

[11] Patent Number: 6,151,180
[45] Date of Patent: Nov. 21, 2000

[54] METHOD AND APPARATUS FOR DETECTING DEFECTS ON A DISK IN A HARD DISK DRIVE

[75] Inventor: Ho-Yul Bang, Santa Clara, Calif.

[73] Assignee: Samsung Electronics Co., Ltd., Suwan, Rep. of Korea

[21] Appl. No.: 09/060,782

[22] Filed: Apr. 15, 1998

[51] Int. Cl.[7] .................................. G11B 5/09; G11B 5/02
[52] U.S. Cl. .................................. 360/53; 360/25; 360/48
[58] Field of Search .................................. 360/53, 48, 25; 369/53, 58

[56] References Cited

U.S. PATENT DOCUMENTS

| | | |
|---|---|---|
| 4,958,337 | 9/1990 | Yamanaka et al. . |
| 5,442,638 | 8/1995 | Awad et al. .................... 395/182.04 |
| 5,610,776 | 3/1997 | Oh . |
| 5,754,353 | 5/1998 | Behrens et al. .................... 360/53 |
| 5,822,139 | 10/1998 | Ayabe . |
| 5,844,911 | 12/1998 | Schadegg et al. .................... 371/10.2 |

FOREIGN PATENT DOCUMENTS

| | | |
|---|---|---|
| 0426353 A2 | 5/1991 | European Pat. Off. . |
| 0463752 A2 | 1/1992 | European Pat. Off. . |
| 0491563 A2 | 6/1992 | European Pat. Off. . |
| 0582464 A2 | 2/1994 | European Pat. Off. . |
| 0801387A2 | 10/1997 | European Pat. Off. . |
| 63-234455 | 9/1988 | Japan . |
| 2326755 | 12/1985 | United Kingdom . |
| WO 93/10494 A1 | 5/1993 | WIPO . |

*Primary Examiner*—W. Chris Kim
*Attorney, Agent, or Firm*—Irell & Manella LLP

[57] ABSTRACT

A method and apparatus for determining a number of defects detected on a disk in a hard disk drive. The hard disk drive comprises an actuator arm mounted to a housing and a head mounted to the actuator arm. A spin motor is mounted to the housing and a disk is attached to the spin motor. The disk has a plurality of tracks, each of which has a plurality of sectors. Each of the sectors has a data field. The hard disk drive further comprises a defect detection circuit coupled to the head that detects a number of defects located in the data field. In one embodiment, the hard disk drive comprises a defect size detection circuit coupled to the head, that detects a corresponding size of each defect detected.

20 Claims, 6 Drawing Sheets

METHOD AND APPARATUS FOR DETECTING DEFECTS ON A DISK IN A HARD DISK DRIVE

BACKGROUND OF THE INVENTION

1. Field of the Invention

The present invention relates in general to disk storage systems and more particularly, to a method and apparatus for detecting defects on a disk in a disk drive assembly.

2. Description of the Related Art

Disk drives are magnetic recording devices used for the storage of information. The information is recorded on concentric tracks on either surface of one or more magnetic recording disks. The disks are rotatably mounted to a spin motor and information is accessed by means of read/write heads that are mounted to actuator arms which are rotated by a voice coil motor. The voice coil motor is excited with a current to rotate the actuator and move the heads. The read/write heads must be accurately aligned with the storage tracks on the disk to ensure proper reading and writing of information. The read/write heads read recorded information from the surface of the disk by sensing the magnetic transitions emanating from the surface of the disk.

The ability to store and read back information from the disk in the form of magnetic transitions may be impaired by the presence of disk defects. Disk defects can manifest themselves in several ways. One way is simply as noise associated with the random nature of the disk surface. Often, this noise can be easily separated from the ambient noise in the readback channel by measuring the noise from the preamplifier with the head flying over the disk and then repeating the measurement with the head unloaded from the disk.

More troublesome are flaws or defects in the disk surface that manifest themselves as missing bits or as extra bits of data (i.e., as single bit errors). Missing bits are reductions in the amplitude of the envelope of the signal, usually over a small number of bits (e.g., 1–4 bits) such that the amplitude falls below the channeldetector clipping level. The number of missing bits observed depends on the setting of the clipping level in the read-back channel.

One common technique for avoiding the problem of missing or extra bits is to perform a surface analysis of the disk. This surface analysis yields an error map of the disk surface. The error map can then be referred to as a means of avoiding localized disk flaws. Surface analysis consists of scanning all of the data tracks on the disk for defects. The disk drive system typically utilizes an error correction code to attempt to correct the disk defects. The located defects which are uncorrectable are placed on a defect list which is later stored in random access memory (RAM) during the burn-in process. The defect list will then be made available to disk formatter programs, which write sector headers that identify defective sectors so that these sectors remain unused.

Disk defects, if left uncorrected, have a tendency to increase in size and thus affect adjacent bits and/or data sectors. Although conventional systems have generally been capable of disk defect detection, they lack the means for ascertaining the number, length and/or size of defects that exist on the disk. As a result, users of such conventional systems are unable to take precautionary measures in avoiding use of certain data sectors that are at risk of being affected by existing disk defects which have a tendency to increase in size.

Accordingly, there is a need in the technology for a method and apparatus for a method and apparatus for detecting the number and sizes of defects on a disk in a disk drive assembly. Such a method and apparatus facilitates improved defect detection and disk defect prediction, so that improved production yield may be achieved.

BRIEF SUMMARY OF THE INVENTION

A method and apparatus for determining a number of defects detected on a disk in a hard disk drive. The hard disk drive comprises an actuator arm mounted to a housing and a head mounted to the actuator arm. A spin motor is mounted to the housing and a disk is attached to the spin motor. The disk has a plurality of tracks, each of which has a plurality of sectors. Each of the sectors has a data field. The hard disk drive further comprises a defect detection circuit coupled to the head that detects a number of defects located in the data field. In one embodiment, the hard disk drive comprises a defect size detection circuit coupled to the head, that detects a corresponding size of each defect detected.

DETAILED DESCRIPTION OF THE INVENTION

Figure 1:
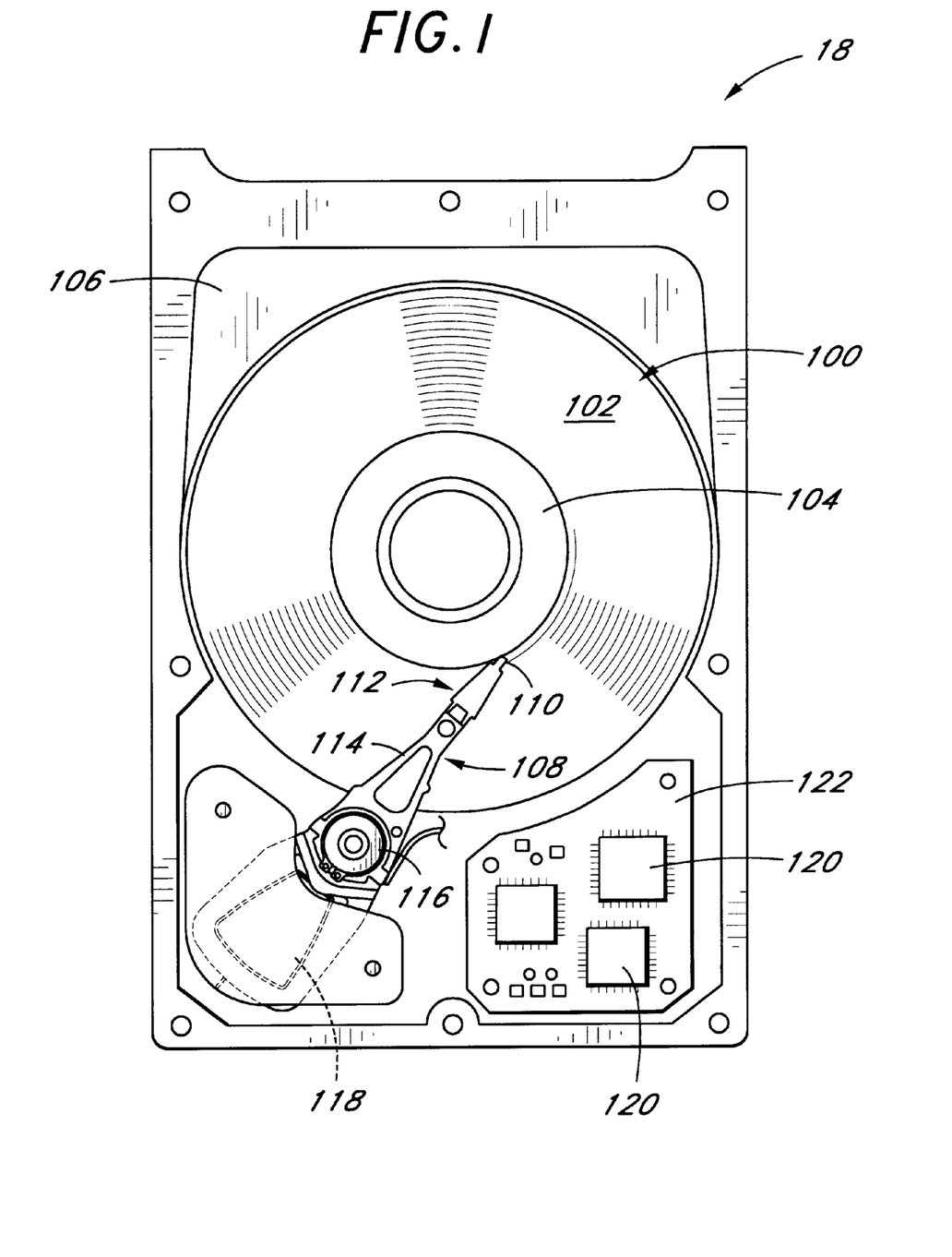
FIG. 1 illustrates a hard disk drive which implements the apparatus and method of the present invention.

The present invention is a method and apparatus for detecting the number and corresponding size of defects on a disk in a disk drive assembly. Referring to the drawings more particularly by reference numbers, FIG. 1 shows a hard disk drive 100. The disk drive 100 includes a disk 102 that is rotated by a spin motor 104. The spin motor 104 is mounted to a base plate 106. Also mounted to the base plate 106 is an actuator arm assembly 108. The actuator arm assembly 108 includes a number of heads 110 mounted to corresponding flexure arms 112. The flexure arms 112 are attached to an actuator arm 114 that can rotate about a bearing assembly 116. The assembly 108 also contains a voice coil 118 that is coupled to the magnets 119 that are mounted to the base plate 106. Energizing the voice coil 118 moves the heads 110 relative to the disk 102. There is typically a single head for each disk surface. The spin motor 104, voice coil 118 and the heads 110 are coupled to a number of electronic circuits 120 mounted to a printed circuit board 122. In the following discussion, only one head 110 is referenced. The electronic circuits 120 typically include a read channel circuit, a microprocessor-based controller and a random access memory (RAM) device.

Figure 2:
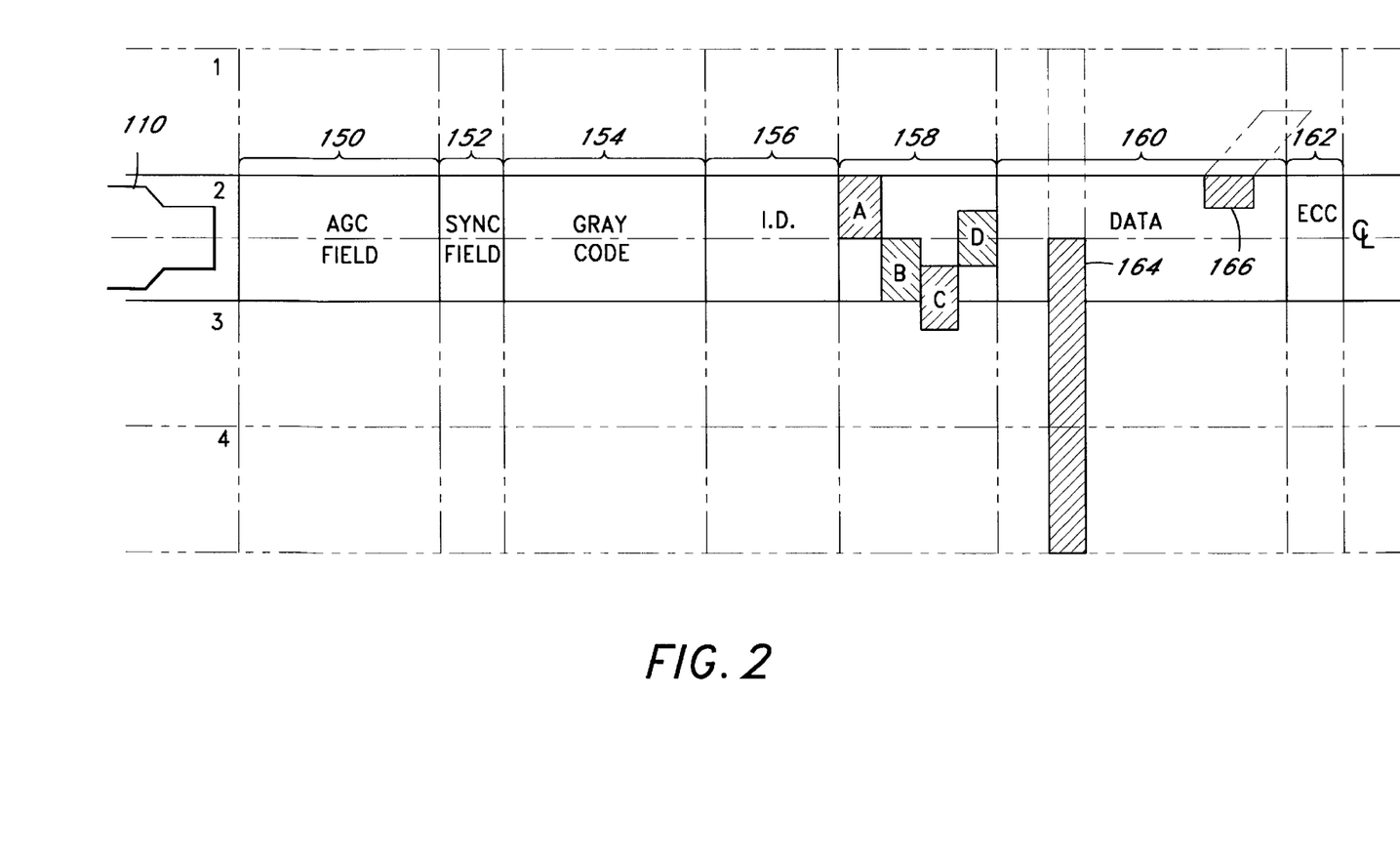
FIG. 2 illustrates the general layout of the servo field region of a track.

As shown in FIG. 2, data is typically stored within sectors of radially concentric tracks located across the disk 102. A typical sector will have an automatic gain control (AGC) field 150, a synchronization (sync) field 152, a gray code field 154 that identifies the track, an identification (ID) field 156 that defines the sector, a servo field 158 which includes a number of servo bursts A, B, C, D, a data field 160 which contains the data and an error correction code field 162. In operation, the head 110 is moved to a track and the servo information provided in servo field 158 is read and provided to the electronic circuits 120. In the event that a disk defect, such as defect 164 or 166 is detected, the present invention determines the length or size of the defect 164 or 166 and the number of defects 164, 166 present. The present invention then determines if the error correction code in the error correction code field 162 is capable of supporting correction of the defects 164 and/or 166. If so, error correction is performed. Otherwise, information related to defect length and number is stored in memory.

Figure 3:
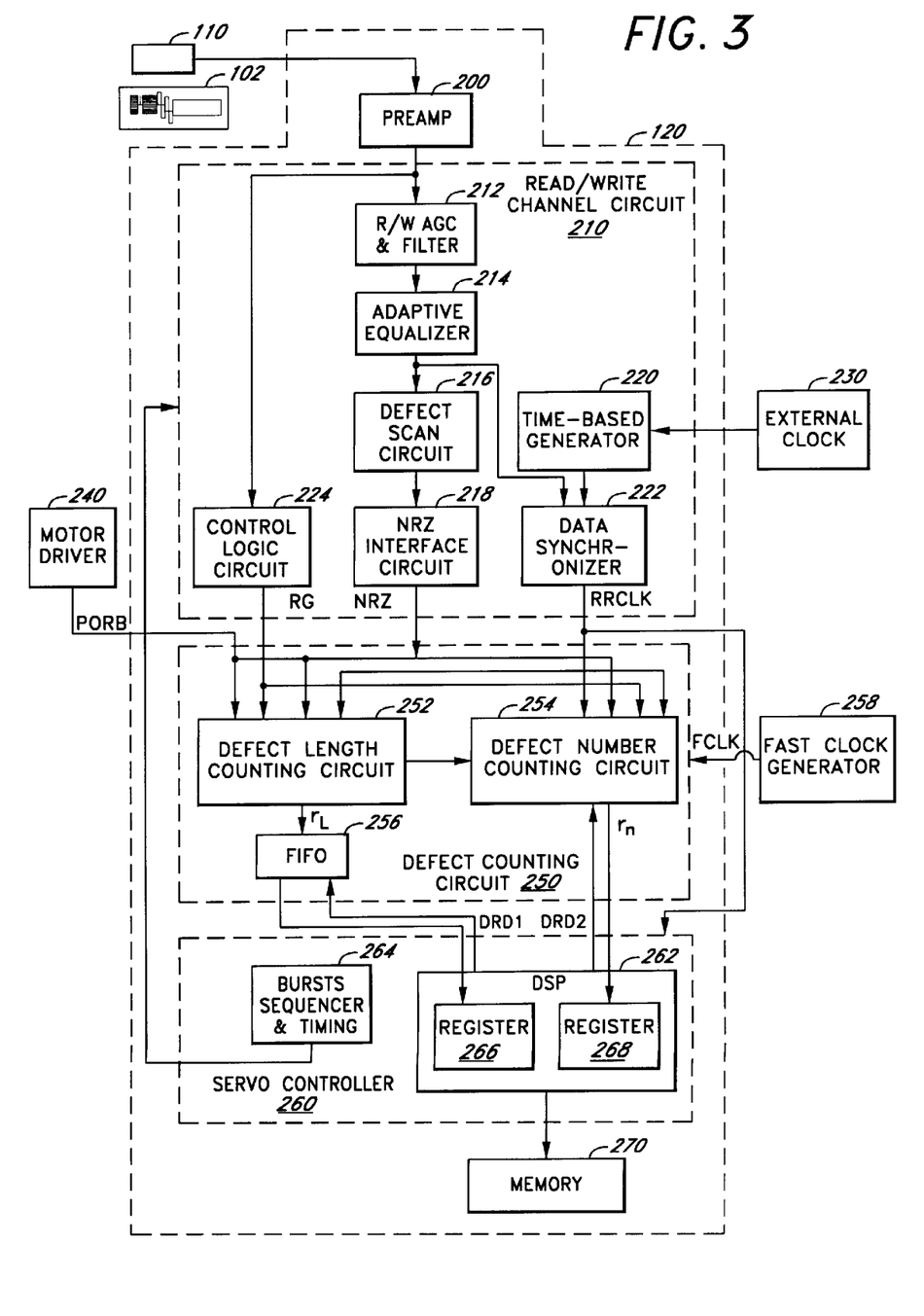
FIG. 3 is a block diagram of portions of an integrated circuit read channel in accordance with the present invention.

FIG. 3 is a block diagram of an electronic circuit 120 of the drive. The electronic circuit 120 includes a preamplifier 200 which is coupled to a read/write (R/W) channel circuit 210. The R/W channel circuit 210 includes a R/W Automatic Gain Control (AGC) and filter circuit 212, an adaptive equalizer 214, a defect detection circuit 216 and a Non-Return-to-Zero (NRZ) interface circuit 218. The R/W channel circuit 210 also comprises a time-based generator 220, a data synchronizer 222 and a control logic circuit 224. The electronic circuit 120 further comprises a defect counting circuit 250 that is coupled to the R/W channel 210. The defect counting circuit 250 comprises a defect length counting circuit 252, a defect number counter 254 and a First-In-First-Out (FIFO) counter 256. The electronic circuit 120 further comprises a microprocessor-based servo controller 260 which includes a digital signal processor (DSP) 262 and a burst sequencer and timing circuit 264; and a memory 270, such as a random access memory (RAM) device.

In operation, the electronic circuit 120 is coupled to one of the magnetic heads 110 which senses the magnetic field of a magnetic disk 102. When reading the servo information located in the servo field region 10 on the disk 102, the head 110 generates a read signal that corresponds to the magnetic field of the disk 102. The read signal is first amplified by the preamplifier 200, and then provided to the R/W channel circuit 210. The AGC data included in the read signal is provided to the R/W AGC and filter circuit 212. The R/W AGC circuit in circuit 212 monitors the AGC data provided by the read signal and the read signal is then filtered by the filter circuit located in the R/W AGC and filter circuit 212. The resulting read signal is then equalized by the adaptive equalizer 214. The filtered and equalized signal is next provided to the defect scan circuit 216.which operates to detect variations on the read signal through comparison with a predetermined signal level.

To accomplish this, the defect scan circuit 216 may, for example, include a fullwave rectifier (not shown) which rectifies the read signal, and a peak-detector (not shown), which compares the rectified signal with a predetermined reference signal. If the amplitude of the read signal is greater than the predetermined reference signal, it will not be identified as a defect, and a low output signal will be provided to the NRZ Interface circuit 218. Conversely, if the amplitude of the read signal is less than the predetermined reference signal, it will be identified as a defect, and a high output signal will be provided to the NRZ Interface circuit 218. The NRZ Interface circuit 218 outputs a signal NRZ in response to the output of defect scan circuit 216. In particular, the NRZ Interface Circuit 218 outputs a logical high signal in response to the presence of a defect and a logical low signal in the absence of a defect. The resulting output signal NRZ is then provided to the defect counting circuit 250.

The time-based generator 220 receives clock signals from an external clock 230, based on which the time-based generator 220 generates and provides reference clock pulses of a predetermined frequency to the data synchronizer 222. In particular, the time-based generator 220 generates reference clock pulses with a particular frequency for a particular zone of the disk 102. The data synchronizer 222 also receives sampled read signals from the adaptive equalizer 214. Based on the reference clock pulses and the sampled read signals, the data synchronizer generates a read reference clock signal RRCLK, which is provided to both the defect counting circuit 250 and the servo controller 260.

The control logic circuit 224 receives the read-signal from the preamplifier 200, and generates a read gate signal RG, which indicates that a read operation is in progress. The control logic circuit 224 also generates a logical low sync byte detect signal ($\overline{SDB}$) upon detection of a sync byte.

The defect counting circuit 250 receives the NRZ, the RRCLK and the RG signals from the read/write channel circuit 210 and provides these signals to the defect length counting circuit 252 and the defect number counting circuit 254 upon the first clock FCLK signal from the fast clock generator 258. A power reset signal PORB provided by a motor driver circuit 240 (located in spin motor 104 of FIG. 1) is also provided to the defect length counting circuit 252 and the defect number counting circuit 254 upon the first clock signal FCLK from the fast clock generator 258. The use of the fast clock generator 258 in driving the circuits 252 and 254 ensures that the circuits 252 and 254 will not miss any of the NRZ signals provided by the defect scan circuit 216 and the NRZ Interface Circuit 218. In one embodiment, the clock signals FCLK generated by the fast clock generator 258 are provided at twice the frequency of the RRCLK signals. It is understood by one of ordinary skill in the technology that the frequency of the FCLK signals may be any positive multiple of the frequency of the RRCLK signals. The PORB signal is issued when the supply voltage of the hard drive assembly 100 is less than 5V or greater than 12V.

The defect length counting circuit 252 generates signals $R_L$ representative of the size (i.e. bytes) over which a particular defect, for example, defect 164 or 166 (see FIG. 2) covers. A first-In-First-Out (FIFO) buffer 256 is used to store this information. The defect number counting circuit 254 generates a signal rn representative of the number of defects in a particular data sector. The signals $R_L$ and $r_n$ are provided to the DSP 262, upon the issuance of control signals DRD1 and DRD2 respectively. The data corresponding to defect size and number are then stored in corresponding registers 266, 268 in the DSP 262. Upon receipt of data corresponding to the defect size and number, the DSP 262 determines if the error code correction capability of the servo controller 260 is sufficient to guarantee correction. In one embodiment, the ECC capability of the servo controller includes continuously correcting 72 bits at a single burst mode and continuously correcting 24 bits at triple burst mode. If the ECC capability supports the correction of the defects in a particular data sector, error correction is performed. Otherwise, the information related to defect size and number is stored into memory 270.

Figures 4, 4A:
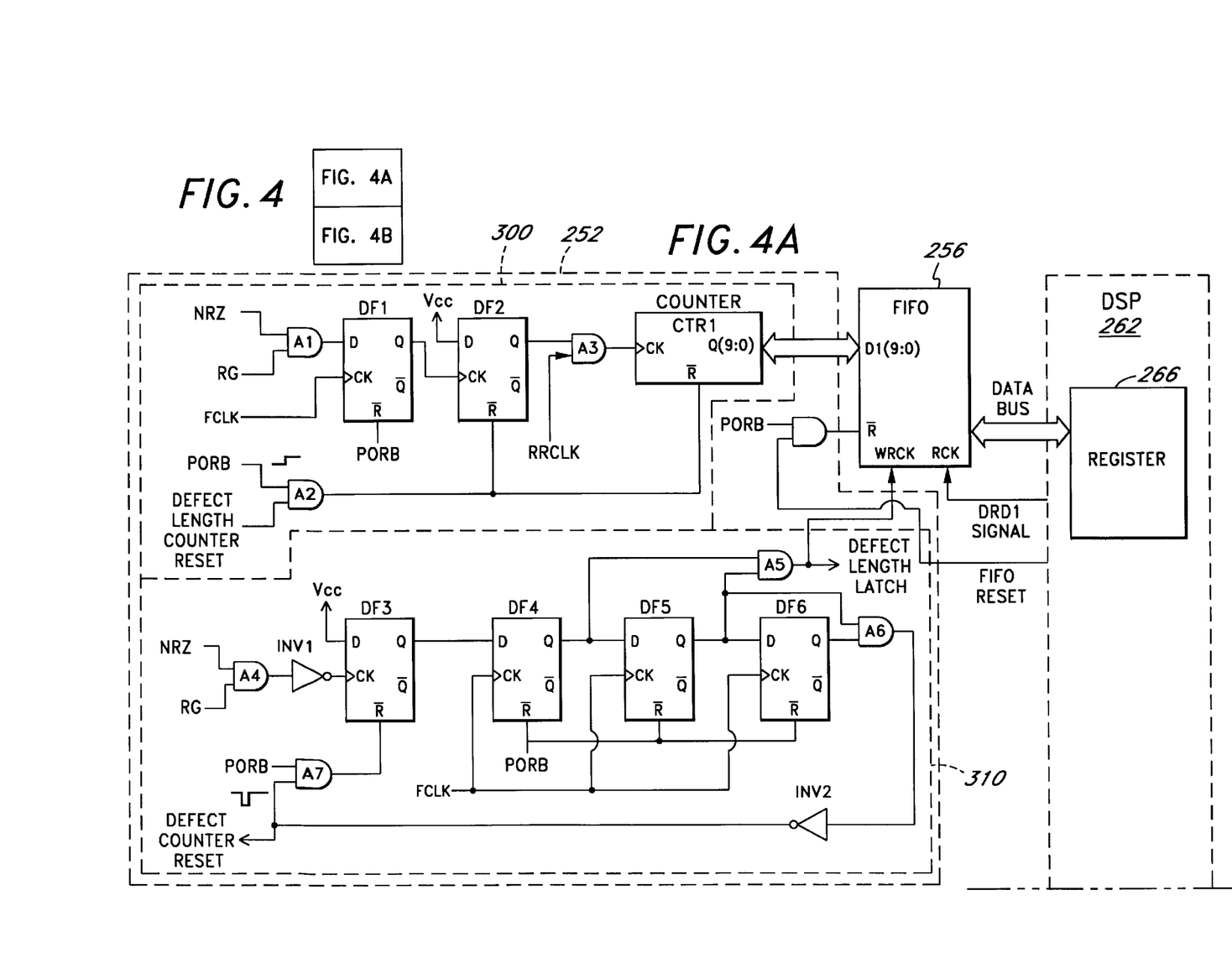
FIG. 4A is a detailed circuit diagram of the defect length counting circuit 252.
Figure 4B:
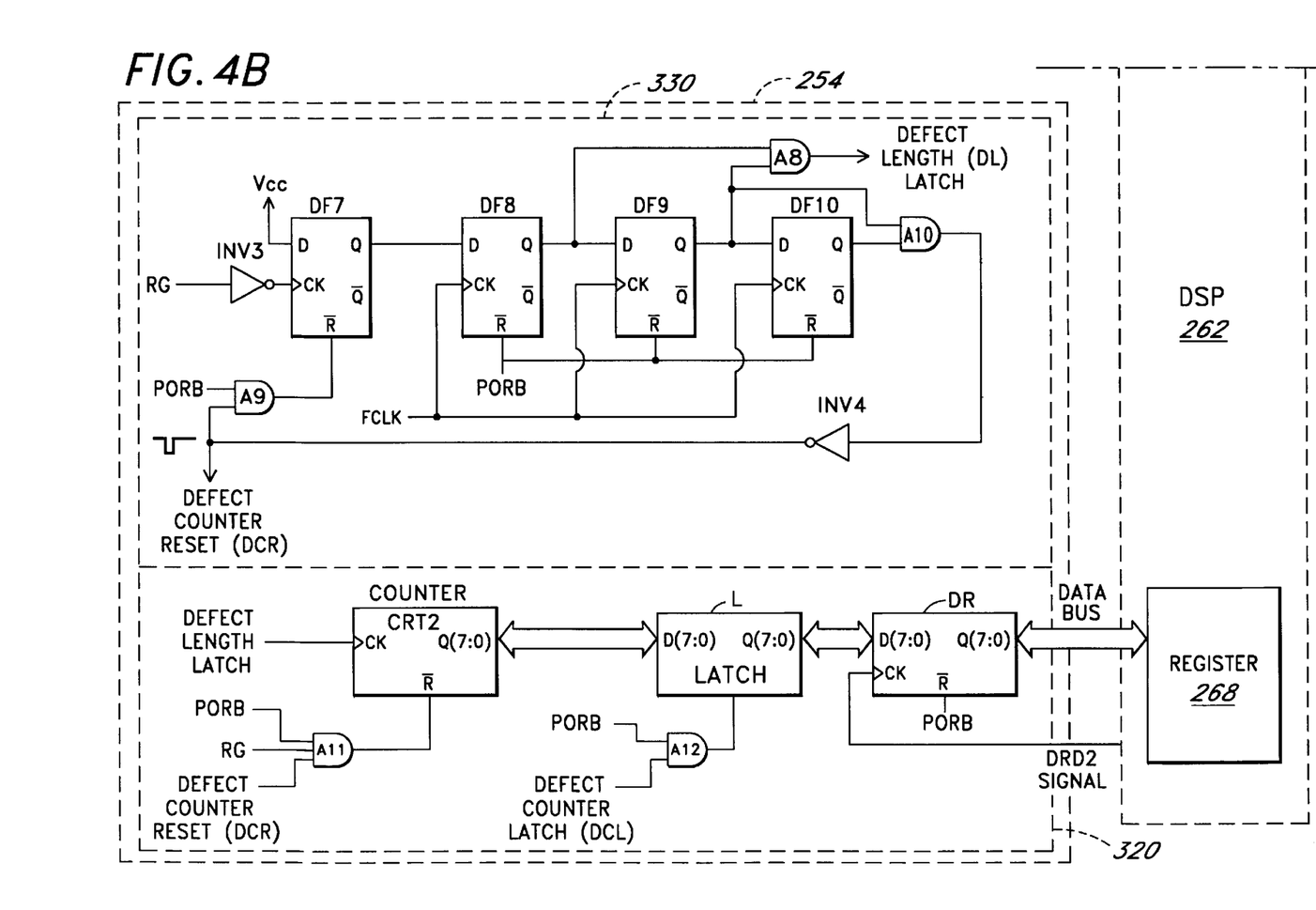
FIG. 4B is a detailed circuit diagram of the defect number counting circuit 254.

FIG. 4A is a detailed circuit diagram of the defect length counting circuit 252 and FIG. 4B is a detailed circuit diagram of the defect number counting circuit 254. Operation of the defect length counting circuit 252 and the defect number counting circuit 254 will now be described with reference to the timing diagram of FIG. 5.

Figure 5:
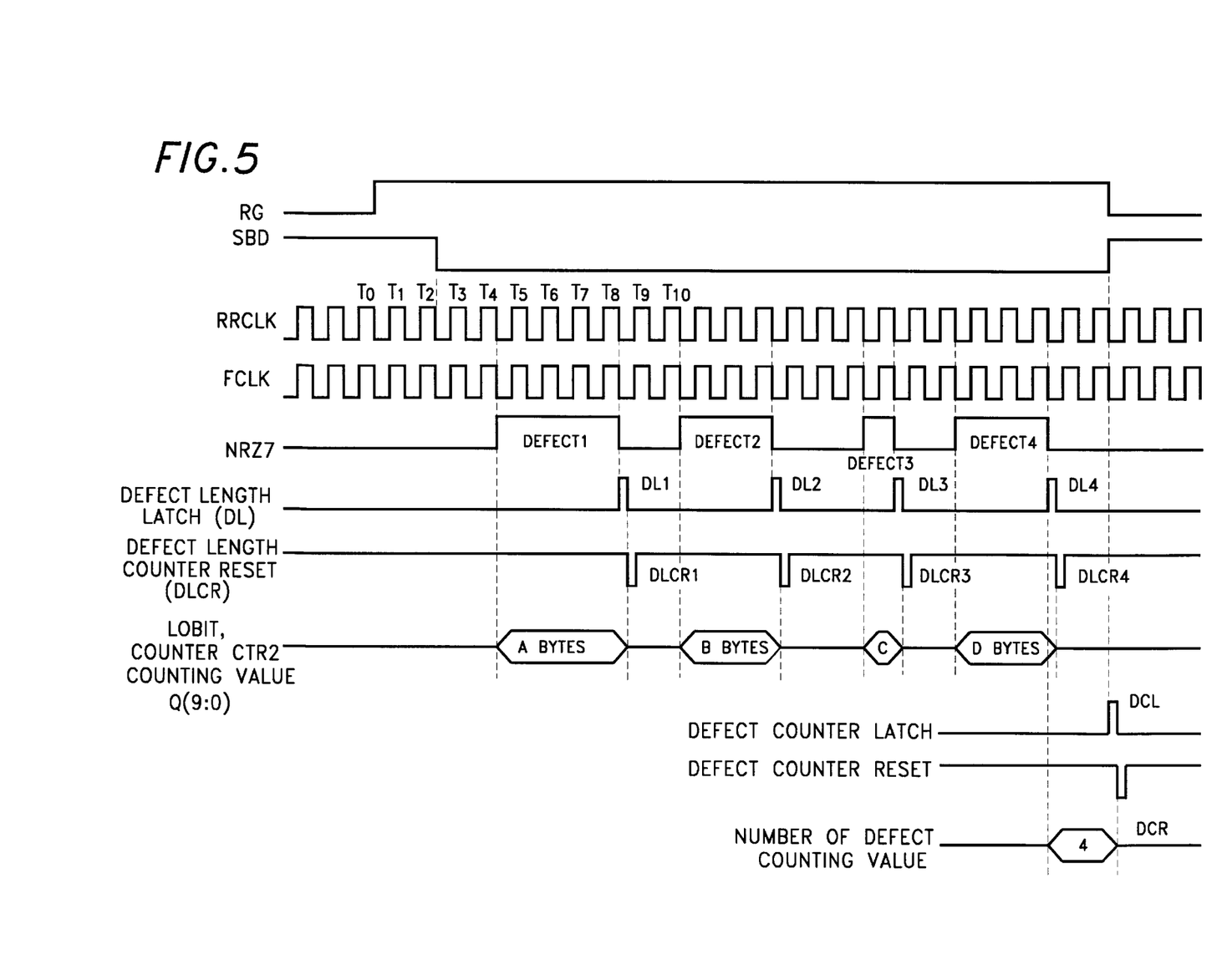
FIG. 5 is a timing diagram which illustrates the timing cycles of the defect length counting process and the defect number counting process of the present invention.

With reference to FIGS. 4A and 5, the operation of the defect length counting circuit 252 will first be described. The defect length counting circuit 252 comprises a counting circuit 300 and a defect length latch circuit 310. The counting circuit 300 comprises AND gates A1–A3, a counter CTR1 and D flip-flops DF1, DF2. The NRZ and RG signals from the NRZ interface circuit 218 and the logic circuit 224 respectively, are first provided to AND gate A1, which generates a logical high signal only when a defect is detected (when NRZ is a logical high e.g., after RRCLK cycle T4) during the read operation (when RG is a logical high signal, e.g., after RRCLK cycle TØ). When this occurs, the output of the AND gate A1 is provided to an input of a D flip-flop DF1, which also receives FCLK signals from the fast clock generator 258. The FCLK signals are used to drive DF1 to ensure that DF1 will not miss any of the NRZ pulses (provided by the NRZ interface 132, which is driven by the RRCLK signals) indicative of the occurrence of a defect. The D flip-flop DF1 generates an output signal which drives the clock input of a second D flip-flop DF2. The input of DF2 is tied to a constant voltage VCC, so that an output is generated only when DF2 receives a clock input signal from DF1. The output of DF2 is provided to AND gate A3, which also receives clock signals RRCLK as inputs. The AND gate A3 thus generates an output with each RRCLK input pulse when the output of DF2 is a logical high (i.e., when there is a defect detected during the read operation). Each output pulse provided by the AND gate A3 will be provided as an input to the counter CTR1, which counts the number of bytes over which the defect 164 or 166 covers. The counter CTR1 is initially set to zero, and each pulse provided by AND gate A3 increments the counter by a count of 1. For example, in the example shown in FIG. 5, defect 1 lasts for a duration of 4 RRCLK pulses, so that CTR1 will have a final count of 4.

The total count is latched into FIFO 256 upon issuance of a WRCK clock signal provided byte the defect length latch circuit 310 when the defect (for example defect 1) is no longer detected by the defect scan circuit 216.

As shown in FIG. 4A, the defect length latch circuit 310 comprises AND gates A4–A6, D flip-flops DF3–DF6, and inverters INV1, INV2. When a defect, such as defect 1, is no longer detected by the defect detection circuit 216, NRZ becomes a logical low (e.g., after the RRCLK pulse T8). The NRZ and RG signals from the NRZ interface circuit and the logic circuit respectively, are provided to AND gate A4. In response, the AND gate A4 generates a logical high signal which is first inverted by inverter INV1 and then provided to a clock input of a D flip-flop DF3. The D flip-flop DF3 thus remains inactive as long as the output of the defect detection circuit 216, i.e., NRZ is a logical high. However, when a defect is no longer detected, NRZ becomes a logical low, resulting in providing a logical high signal to the input terminal of DF3.

In response, DF3 generates a logical high output, which is provided to D flip-flop DF4, which in turn provides a logical high output to DF5, which in turn generates a logical high output to DF6. The D flip-flops DF4, DF5 and DF6 are driven by FCLK, which, in one embodiment is operated at twice the frequency of RRCLK. The outputs of DF4 and DF5 are provided to AND gate 5, which is in turn provided to the WRCK terminal of FIFO 256. Thus, DF4, DF5 and A5 operate to provide a short timing delay and also to provide a defect length latch pulse DL1, as provided at the output of A5, act as a clock signal WRCK so as to latch the count value of CTR1 into FIFO 256. The value stored in FIFO 256 will be latched into the register 266 in DSP 266 upon issuance of a control signal DRD1, from the DSP 262 to the FIFO 256. The outputs of DF5 and DF6 are also provided to AND gate A6, which generates an output that is inverted by inverter INV2, to provide a defect length counter reset signal DLCR, that is used in conjunction with the PORB signal via AND gate A2, to reset DF2 and CTR1 when a defect is no longer detected by the defect detection circuit 216. In this manner, the defect length latch circuit 310 can be reset when a defect is no longer detected.

In this manner, the sizes or lengths (in bytes) of defects that are detected, such as defect 1, defect 2, defect 3 and defect 4 can be counted by CTR1 and stored into FIFO 256. The count value stored in FIFO 256 can then be accessed by the DSP 262 as required. The DF1 is reset when PORB is a logical high; DF2 and CTR1 are reset when both PORB and the defect length counter reset signal DLCR are both logical high. The FIFO 256 is reset when both: PORB is a logical high and when a FIFO reset is issued.

With reference to FIG. 4B and FIG. 5, the operation of the defect number counting circuit 254 will next be described. The defect length latch signals DL1, DL2 DL3 and DL4 are used by the defect counting circuit 254 to increment the count value of a second counter CTR2. In particular, the defect counting circuit 254 comprises a defect counting circuit 320 and a defect number latch circuit 330. The defect counting circuit 320 comprises counter CTR2, D flip-flop L, a defect register DR and AND gates A11, A12. The output of AND gate A5 of the defect length latch circuit 310 is provided as an input of the counter CTR2. Thus, each time the defect length latch pulses DL1, DL2, DL3 and/or DL4 is latched into the counter CTR2, the count value of counter CTR2, which is initially set to zero, is incremented. The count value stored in CTR2 is latched into defect register DR by a latch circuit L, when the read operation, as represented by the signal RG is no longer in progress, i.e., at the falling edge of RG and when $\overline{SDB}$ transitions from a logical low signal to a logical high signal, indicating that the read operation for a particular sector has ended. The latch circuit L is enabled when both PROB is a logical high and when the defect counter latch DCL signal is a logical high. The contents of the latch circuit L are then provided to defect register DR. The contents of the defect register DR are latched into the register 268 of the DSP 262 upon issuance of a control signal DRD2.

The defect number latch circuit 330 comprises AND gates A8–A10, D flip-flops DF7–DF10 and inverters INV3, INV4. The RG signal is provided as an input to inverter INV3. Thus, at the falling edge of the RG signal, the inverter INV3 inverts the logical low RG signal to provide a logical high signal that is provided as a clock input to D flip-flop DF7, which also has an input that is tied to a constant voltage VCC. The output of DF7 is provided as an input to DF8, which in turn generates an output which is provided as an input to DF9. The output of DF9 is provided as an input to DF10. The outputs of DF8 and DF9 are provided as inputs to AND gate A8, which provides an output signal DLCR (such as DLCR1, DLCR2, DLCR3, DLCR4) when the outputs of DF8 and DF9 are both high. As shown in FIG. 4B, DF8, DF9 and DF10 are all driven by FCLK, which is operated, in one embodiment, at twice the frequency of RRCLK. The outputs of DF9 and DF10 are provided as inputs to AND gate A10, which generates a logical high output when the outputs of DF9 and DF10 are high. The output of A10 is inverted by inverter INV4 and provided as a defect counter reset signal DCR, used in resetting CTR2 upon completion of the read operation of a particular sector. The output of INV4 is also provided as an input to AND gate A9. The AND gate A9 also receives as an input PORB, and generates an output signal to reset DF7 at a time when PORB is a logical high signal and after a short timing delay, when RG is a logical high.

The counter CTR2 is reset when all three of the following conditions hold true: (1) when PORB is a logical high; (2) when the read operation is in progress, i.e., when RG is a logical high; and (3) when the defect counter reset signal DCR is a logical high.

The present invention thus provides a method and apparatus for detecting the number and sizes of defects on a disk in a disk drive assembly. Such a method and apparatus facilitates improved defect detection and disk defect prediction, so that improved production yield may be achieved.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a housing;
   an actuator arm mounted to said housing;
   a head mounted to said actuator arm;
   a spin motor mounted to said housing; and
   a disk attached to said spin motor, said disk having a plurality of tracks, each of said tracks having a plurality of sectors, each of said sectors having a data field, said head to generate a read signal that corresponds to a magnetic field on a corresponding location of said disk;
   a clock circuit to provide clocking pulses;
   an interface circuit coupled to the head, said interface circuit generating a defect reference pulse indicative of an occurrence of a defect if the read signal is less than a predetermined reference signal, the defect reference pulse having a pulse width corresponding to a time interval during which the read signal is less than the predetermined reference signal, said pulse width being greater than a clocking pulse; and
   a defect count circuit coupled to said head, said clock circuit and said interface circuit to detect a number of defects located in said data field, said defect count circuit providing a count corresponding to each occurrence of a defect reference pulse, said number of defects being a total of said count.

2. The hard disk drive of claim 1, further comprising a defect size detection circuit coupled to said head, for detecting a size of each defect detected.

3. The hard disk drive of claim 2, wherein said size is measured in bytes.

4. The hard disk drive of claim 2, further comprising a buffer for storing said size of each defect detected.

5. The hard disk drive of claim 1, wherein each sector has a track identification field having bits representative of a track location, and a sector identification field having bits representative of a sector location.

6. The hard disk drive of claim 5, further comprising:
   a processing circuit coupled to said defect count circuit; and
   a memory coupled to said processing circuit;
   wherein said processing circuit determines if said defects detected can be corrected, if so, said processing circuit corrects said defects detected, otherwise, said processing circuit stores in said memory, said number of defects detected, a corresponding track location of each defect detected and a corresponding sector location of each defect detected.

7. The hard disk drive as recited in claim 6, wherein said processing circuit issues a control signal to said defect count circuit to retrieve said number of defects detected.

8. The hard disk drive of claim 2, wherein each sector has a track identification field having bits representative of a track location, and a sector identification field having bits representative of a sector location.

9. The hard disk drive of claim 8, further comprising:
   a processing circuit coupled to said defect count circuit and said defect size detection circuit;
   a memory coupled to said processing circuit; and
   wherein said processing circuit determines if said defects detected can be corrected, if so, said processing circuit corrects said defects detected, otherwise, said processing circuit stores in said memory, said number of defects detected, a corresponding size of each defect detected, a corresponding track location of each defect detected and a corresponding sector location of each defect detected.

10. The hard disk drive as recited in claim 9, wherein said processing circuit issues a control signal to said defect size detection circuit to retrieve said size of each number of defect detected.

11. A method for detecting a number of defects on a disk in a hard drive assembly, comprising:
    providing a disk attached to a hard disk drive assembly, said disk having a plurality of tracks, each of said tracks having plurality of sectors, each of said sectors having a data field that has a plurality of data bits;
    reading the plurality of data bits in one of said plurality of sectors;
    generating a read signal based on said reading of the plurality of data bits;
    generating a plurality of clocking pulses;
    generating a defect reference pulse indicative of an occurrence of a defect if the read signal is less than a predetermined reference signal, the defect reference pulse having a pulse width corresponding to a time interval during which the read signal is less than the predetermined reference signal, said pulse width being greater than a clocking pulse;
    counting each occurrence of a defect reference pulse to provide a total count; and
    providing said total count as a number of errors in said data field.

12. The method as recited in claim 11, further comprising determining a corresponding size of each defect located in said data field.

13. The method as recited in claim 12, wherein determining a corresponding size includes providing the corresponding size in bytes.

14. The method as recited in claim 12, further comprising storing said corresponding size of each defect.

15. The method as recited in claim 11, wherein in providing a disk, each sector has a track identification field having bits representative of a track location, and a sector identification field having bits representative of a sector location.

16. The method as recited in claim 15, further comprising determining if said defects detected can be corrected, if so, correcting said defects detected, otherwise, storing said number of defects detected, a corresponding track location of each defect detected and a corresponding sector location of each defect detected.

17. The method as recited in claim 16, further comprising issuing a control signal to retrieve said number of defects detected.

18. The method as recited in claim 12, wherein in providing a disk, each sector has a track identification field having bits representative of a track location, and a sector identification field having bits representative of a sector location.

19. The method as recited in claim 18, further comprising determining if said defects detected can be corrected, if so, correcting said defects detected, otherwise, storing said number of defects detected, a corresponding size of each defect detected, a corresponding track location of each defect detected and a corresponding sector location of each defect detected.

20. The method as recited in claim 19, further comprising issuing a control signal to retrieve said corresponding size of each defect detected.

* * * * *